United States Patent Office 2,694,055
Patented Nov. 9, 1954

2,694,055

METALLIC AZO PIGMENTS

Thomas E. Ludwig and Oswald E. Knapp, Chicago, Ill., assignors to The Sherwin-Williams Company, Cleveland, Ohio, a corporation of Ohio No Drawing. Application December 10, 1951,
Serial No. 260,931

16 Claims. (Cl. 260—151)

This invention relates to an improved class of azo pigments of a water-insoluble character having excellent stability upon exposure to heat, light, solvents, etc.

More particularly, this invention relates to the water-insoluble metal salts of the coupling of diazotized dichloranilinesulfonic acid with 2-hydroxy-3-naphthoic acid to produce pigmentary substances of red to maroon shade characterized by their excellent light-fastness and durability, particularly when incorporated as a pigmentary component of exterior coating compositions, printing inks, baking enamels, and plastic materials wherein pigments are dispersed for coloration thereof.

In addition to the excellent durability of the class of azo pigments herein described, coating compositions containing the said pigments are of further advantage over many pigments of red hue in their non-bleeding character when overcoated with white or light colored compositions of similar nature, or when in contact with organic solvents, fats, oils, etc. Further superiority resides in their excellent heat stability in thermally processed plastic masses and baking enamels.

Heretofore a number of azo compounds of red hue have been manufactured by diazotizing substituted anilines and coupling with 2-naphthol, 2-hydroxy-3-naphthoic acid and various sulfonated and aminated naphthols. The majority of the resultant products are useful only in the textile arts. A few of these dyestuffs have been laked on substrates or precipitated as metal salts to render them useful for pigmentary purposes. The azo pigment art has advanced but little since the early part of the century with the coupling of para-chloro-meta-toluidine-ortho-sulfonic acid with 2-naphthol (U. S. Patent 733,280; July 7, 1903); the same amine with 2-hydroxy-3-naphthoic acid (U. S. Patent 983,486; February 7, 1911); and para-chloroaniline-ortho-sulfonic acid with 2-hydroxy-3-naphthoic acid (U. S. Patent 743,071; November 3, 1903). The only recent patent of which we are aware in this field relates to the selection of the manganese salt of the coupling described in U. S. Patent 743,071 as disclosed in U. S. Patent 2,225,665 issued December 24, 1940. It is there stated that the manganese salt of that coupling yields pigmentary material of improved light-fastness peculiar to that metal ion.

Through additional research on azo pigments, we have discovered two unusual and unexpected results. One result is that upon introduction of an additional chlorine atom into the monochloroanilinesulfonic acid that the coupling of the dichloroaniline sulfonic acid with 2-hydroxy-3-naphthoic acid and precipitation of a water-insoluble metallic salt yields a class of pigments of improved light and heat stability of red to maroon hue, and that while the manganese salt is very good, other metallic cations may be used in place of the manganese without deterioration in the stable quality of the pigment. The magnesium salt is particularly useful, and from our experience with the various water-insoluble metallic salts of the above coupling, the manganese, magnesium, calcium, barium, strontium, cerium, lead, zinc and cadmium salts, as well as admixtures thereof, produce a class of extremely useful red to maroon pigments.

The second unusual discovery resulting from our researches is that the five ring isomers of dichloroaniline-monosulfonic acid which can be adapted to commercial production readily, when diazotized and coupled with 2-hydroxy-3-naphthoic acid, all produce, as the water-insoluble metal salts, pigments of excellent durability in respect to heat and light stability. However, test results indicate that in those ring isomers where the two chlorine groups are in ortho position to one another, optimum pigmentary properties are obtained as a result of the coupling described. This result was not expected, for it is usual in the art to find only a very few select isomers of the parent amines to be commercially acceptable in the production of azo-type pigments.

It has been found, therefore, that the addition of more than one mol of chlorine to the anilinesulfonic acid molecule, and particularly when the halogens are in ortho position to one another, improves the water-insoluble metal salts of the coupling of said amine in pigmentary properties, particularly as regards their durability upon exposure to heat and light. Further, it has been found that the improvement is not limited to a particular metal salt, but that a number of metal cations which form water-insoluble metal salts may be employed.

It is the broad object of this invention to provide a novel and useful class of red to maroon azo pigments comprising the water-insoluble metal salts of the coupling of diazotized ring isomers of dihalogen-substituted anilinemonosulfonic acids with 2-hydroxy-3-naphthoic acid.

It is more specifically an object of this invention to provide a class of red to maroon azo pigments of improved light and heat stability having the probable generic structural formula in the acid form of:

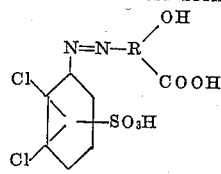

where R is a naphthalene nucleus, and the water-insoluble pigmentary product is formed by treatment of the said acid form with a metal cation selected from the group consisting of manganese, magnesium, calcium, barium, strontium, cerium, lead, zinc, cadmium, and mixtures thereof.

It is a specific object of this invention to provide an improved class of water-insoluble red to maroon azo pigments which comprises the diazotization and coupling product of dichloroanilinemonosulfonic acid with 2-hydroxy-3-naphthoic acid wherein the acidic hydrogen ions are supplanted with a metal cation which forms a water-insoluble product. Particularly outstanding metal cations are magnesium, manganese and cerium.

It is more specifically an object to provide a red to maroon pigment of superior light fastness, heat resistance and durability upon exposure to the elements in a film-forming matrix which consists of the manganese or magnesium salt of diazotized 2,3-dichloroaniline-5-sulfonic acid, 3,4-dichloroaniline-5-sulfonic acid or 3,4-dichloroaniline-6-sulfonic acid coupled to 2-hydroxy-3-naphthoic acid.

The manufacture and synthesis of red to maroon azo pigments within the scope of our discovery are illustrated, but not exhaustively, by the following examples, a part of which are set forth in tabular form, in which the parts are by weight unless otherwise specified.

EXAMPLE I

To a solution of 1200 parts of water and 50 parts of 28% ammonium hydroxide are added 121 parts of 2,3-dichloroaniline-5-sulfonic acid. Solution of the amine is effected by heating the mixture to 45 degrees C. Add 129 parts of 32% HCl and adjust temperature to 0 degrees C. with an excess of ice. Add to the cooled solution 35 parts of sodium nitrite thus diazotizing the amine. Label as Item I.

In a separate vessel 97 parts of 2-hydroxy-3-naphthoic acid are dissolved in 500 parts water with 38 parts sodium hydroxide and 24 parts sodium carbonate by heating. Dilute and cool to 3400 parts total with water and ice to 20 degrees C. Label as Item II.

Item I is added to Item II with good agitation of the reactants. Coupling occurs and the sodium salt of the pigment results.

The pH of the mass is adjusted to 8.3–8.7 and the mass boiled, whereupon the pigment sodium salt is filtered off.

The precipitated salt is reslurried in 9000 parts water and the pH adjusted to between 8.4 and 8.6. The slurry is heated to 95 degrees C. and 80 parts of manganese chloride are added in an aqueous solution. Boil the mixture 10 minutes and filter, wash and dry the precipitate.

The physical properties of the pigmentary product were as follows:

Hue—bright medium red.
Specific gravity—1.75.
Bulking value—0.0686.
Hiding power—220.
Oil absorption—45.
Light fastness—excellent.
Stability in steam—set ink—good.
Body and flow in ink—good.
Non-bleeding in oil.
Non-bleeding thru enamel.
Non-bleeding thru lacquer.
Good water resistance.
Good alkali resistance.
Good acid resistance.
Good ease of grinding.
Resistance to fats—excellent.
Heat stability—excellent.

*Table I*

Following the general procedure and directions of Example I, with the substitutions as noted, the following illustrative specific members of the class of pigments herein disclosed were prepared with the following results.

| Amine | Coupling Component | Salts | Shade | Light Fastness |
|---|---|---|---|---|
| 2,3-dichloroaniline-5-sulfonic acid | 2-hydroxy-3-naphthoic acid | Mn | Medium Red | Excellent. |
| Do | do | Mn-Ni, Ce | Medium Dark Reds | Do. |
| Do | do | Mg | Medium Red | Do. |
| Do | do | Ba, Sr, Ca, Pb, Zn, Cd | Medium Reds | Good. |
| Do | do | Mn | Medium Red | Excellent. |
| 3,4-dichloroaniline-6-sulfonic acid | do | Mg | do | Do. |
| Do | do | Ba, Pb, Mn, Ca, Sr, Sn | Brownish Reds | Very Good. |
| 2,5-dichloroaniline-4-sulfonic acid | do | Mn | Dark Red | Excellent. |
| 3,4-dichloroaniline-5-sulfonic acid | do | Mn | Brownish Red | Do. |
| 2,4-dichloroaniline-6-sulfonic acid | do | | | |

The pigments of Table I were dispersed in a variety of organic matrices including printing inks, vinyl resins, oil-modified alkyd varnishes, nitrocellulose lacquers and urea-formaldehyde baking varnishes. Films resulting from the above compositions were excellent in their resistance to heat and light discoloration and their durability upon exposure to the elements.

As is well known, pigments of the above class may be further modified in hue and other characteristics by changes in processing techniques, illustrative of which are:

(1) Modifications of the amine:
   (a) By use of mixtures of various isomers of dichloroanilinesulfonic acid.
   (b) Use of other amines in conjunction with the dichloroaniline sulfonic acid.
(2) Changes in pH, temperature, concentration of reactants and other physical conditions during the pigment synthesis.
(3) The insoluble pigmentary form created through usage of a combination of metal cations.
(4) Use of ancillary materials in conjunction with the pigment formed.
   (a) Resin treatments.
   (b) Fatty acid treatments.
   (c) Surface active agents including nonionic, cationic and anionic types.

The above modifications are in no wise intended to be exhaustive, and other changes in the art of pigment manufacture may be adapted to the class of azo pigments herein described.

Other halogens may be substituted for chlorine with correlative modifications in the nature of the product. Chlorine is, however, the preferred halogen in the dihaloaniline sulfonic acid component.

Having illustrated the invention in a number of its modifications, we claim:

1. A light and heat stable red to maroon pigmentary substance consisting essentially of the water-insoluble metallic salts of the azo dyestuff formed upon diazotization of dichloranilinemonosulfonic acid and coupling of said acid with 2-hydroxy-3-naphthoic acid.

2. A light and heat stable red to maroon pigmentary substance consisting essentially of a water-insoluble metal salt of the azo dyestuff formed upon diazotization of 2-3 dichloroanilinemonosulfonic acid and coupling of said acid with 2-hydroxy-3-naphthoic acid, the metal cation of said salt selected from the group consisting of manganese, magnesium, calcium, cerium, barium, strontium, lead, zinc and cadmium.

3. Same as claim 2, where the salt-forming metal cation is manganese.

4. Same as claim 2, where the salt-forming metal cation is magnesium.

5. Same as claim 2, where the salt-forming metal cation is cerium.

6. A light and heat stable red to maroon pigmentary substance consisting essentially of the water-insoluble metallic salts of the azo dyestuff found upon diazotization of 3,4-dichloroanilinemonosulfonic acid and coupling of said acid with 2-hydroxy-3-naphthoic acid.

7. A light and heat stable red to maroon pigmentary substance consisting essentially of the water-insoluble metallic salts of the azo dyestuff formed upon diazotization of 2,3-dichloroaniline-5-sulfonic acid and coupling of said acid with 2-hydroxy-3-naphthoic acid.

8. A light and heat stable red to maroon pigmentary substance consisting essentially of the water-insoluble metallic salts of the azo dyestuff formed upon diazotization of 3,4-dichloroanilinemonosulfonic acid and coupling of said acid with 2-hydroxy-3-naphthoic acid, the metal cation of said salt selected from the group consisting of manganese, magnesium, cerium, calcium, barium, strontium, lead, zinc and cadmium.

9. Same as claim 8, where the metal cation is manganese.

10. Same as claim 8, where the metal cation is magnesium.

11. A light and heat stable red to maroon pigmentary substance consisting essentially of the water-insoluble metal salts of the azo dyestuff formed upon diazotization of 2,3-dichloroaniline-5-sulfonic acid and coupling of said acid with 2-hydroxy-3-naphthoic acid, the metal cation of said salt selected from the group consisting of manganese, magnesium, cerium, barium, calcium, strontium, lead, zinc, and cadmium.

12. Same as claim 11, where the salt-forming metal is manganese.

13. Same as claim 11, where the salt-forming metal is magnesium.

14. A light and heat stable red to maroon pigmentary substance consisting essentially of the water insoluble metallic salts of the azo dyestuff formed upon diazotization of 3,4-dichloroaniline-5-sulfonic acid and coupling of said acid with 2-hydroxy-3-naphthoic acid, the metal cation of said salt selected from the group consisting of manganese, magnesium, cerium, calcium, barium, strontium, lead, zinc and cadmium.

15. Same as claim 14 where the metal cation is manganese.

16. Same as claim 14 where the metal cation is magnesium.

References Cited in the file of this patent

UNITED STATES PATENTS

| Number | Name | Date |
|---|---|---|
| 787,767 | Julius et al. | Apr. 18, 1905 |
| 978,865 | Ernst et al. | Dec. 20, 1910 |
| 983,486 | Ernst et al. | Feb. 7, 1911 |
| 2,189,806 | Lang et al. | Feb. 13, 1940 |
| 2,335,537 | Reynolds | Nov. 30, 1943 |